(12) United States Patent
Mashiyama

(10) Patent No.: US 12,043,064 B2
(45) Date of Patent: Jul. 23, 2024

(54) TIRE

(71) Applicant: The Yokohama Rubber Co., LTD., Tokyo (JP)

(72) Inventor: Tatsuya Mashiyama, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/448,587

(22) Filed: Sep. 23, 2021

(65) Prior Publication Data

US 2022/0097457 A1    Mar. 31, 2022

(30) Foreign Application Priority Data

Sep. 30, 2020    (JP) .................................. 2020-165320

(51) Int. Cl.
*B60C 11/13* (2006.01)
*B60C 11/03* (2006.01)
*B60C 11/12* (2006.01)

(52) U.S. Cl.
CPC ...... *B60C 11/0316* (2013.01); *B60C 11/0323* (2013.01); *B60C 11/1236* (2013.01); *B60C 2011/0348* (2013.01); *B60C 2011/0351* (2013.01); *B60C 2011/0353* (2013.01); *B60C 2011/0355* (2013.01)

(58) Field of Classification Search
CPC ......... B60C 11/0323; B60C 2011/0353; B60C 2011/0397; B60C 11/1281; B60C 2011/0348; B60C 2011/133
See application file for complete search history.

(56) References Cited

U.S. PATENT DOCUMENTS

2014/0352863 A1    12/2014    Marlier et al.
2017/0174008 A1*   6/2017    Marlier ................. B60C 1/0016
(Continued)

FOREIGN PATENT DOCUMENTS

EP    2191984 A2 *    6/2010    ......... B60C 11/0323
JP    3110847 B2      11/2000
(Continued)

OTHER PUBLICATIONS

English machine translation of EP-2191984-A2. (Year: 2010).*
English machine translation of JP2003-211922 (Year: 2003).*

*Primary Examiner* — Robert C Dye
(74) *Attorney, Agent, or Firm* — Thorpe North & Western

(57)    ABSTRACT

A circumferential narrow main groove extending in a circumferential direction in a tread of a pneumatic tire. The circumferential narrow main groove includes a narrow portion opening to a road contact surface of the tread and a widened portion having a wider groove width than the narrow portion. The widened portion is at a groove bottom. A groove width ratio (W2/W1) of a maximum groove width W2 of the widened portion to a groove width W1 of the narrow groove portion is in a range $1.5 \leq (W2/W1) \leq 4.0$, and a cross-sectional area ratio (A2/A1) of a groove bottom-side cross-sectional area A2 to a groove opening-side cross-sectional area A1 in a meridian cross-section is within a range $1.2 \leq (A2/A1) \leq 4.0$ when the circumferential narrow main groove is divided into two parts at 50% of a maximum groove depth of the circumferential narrow main groove. The cross-sectional area ratio changes along the circumferential direction.

16 Claims, 10 Drawing Sheets

(56) References Cited

U.S. PATENT DOCUMENTS

| | | | |
|---|---|---|---|
| 2018/0147894 A1* | 5/2018 | Haseda | B60C 11/1323 |
| 2018/0244111 A1 | 8/2018 | Zhu et al. | |
| 2018/0345736 A1* | 12/2018 | Cambon | B60C 11/24 |
| 2020/0180363 A1* | 6/2020 | Zivkovic | B60C 11/0323 |
| 2021/0188011 A1* | 6/2021 | Bardin | B60C 11/12 |
| 2022/0080777 A1* | 3/2022 | Bardin | B60C 11/12 |

FOREIGN PATENT DOCUMENTS

| | | | |
|---|---|---|---|
| JP | 2003-211922 | * | 7/2003 |
| JP | 2015-504801 A | | 2/2015 |
| JP | 2018-529565 A | | 10/2018 |
| WO | WO 2020/128235 A1 | | 6/2020 |

\* cited by examiner

| | Conventional Example | Comparative Example 1 | Comparative Example 2 | Comparative Example 3 | Comparative Example 4 |
|---|---|---|---|---|---|
| Presence/absence of change in cross-sectional area ratio (A2/A1) | No | Yes | Yes | Yes | Yes |
| Lower limit of cross-sectional area ratio (A2/A1) | 1.2 | 1.1 | 2.6 | 1.2 | 2.1 |
| Upper limit of cross-sectional area ratio (A2/A1) | 1.2 | 1.3 | 4.2 | 1.3 | 2.7 |
| Groove width ratio (W2/W1) | 1.3 | 1.3 | 4.2 | 1.3 | 2.7 |
| Groove width W1 of narrow groove portion | 1.5 | 1.5 | 2.0 | 1.5 | 1.5 |
| Maximum groove width W2 of widened portion | 2.0 | 2.0 | 8.5 | 2.0 | 4 |
| Depth range (%) of widening starting point | 70 | 20 to 60 | 40 to 60 | 50 to 70 | 45 to 65 |
| Size of first cross-sectional area S1 and second cross-sectional area S2 (Larger one if not identical) | Identical | S2 | S2 | S2 | S1 |
| Ratio (S2/S1) | 1.0 | 2.0 | 1.5 | 1.7 | 0.8 |
| Rolling resistance performance (index value) | 100 | 100 | 90 | 100 | 95 |
| Wet braking performance (index value: at 0% wear) | 100 | 100 | 103 | 100 | 103 |
| Wet braking performance (index value: at 80% wear) | 100 | 100 | 110 | 100 | 105 |
| Change in wet braking performance (index value) | 100 | 100 | 95 | 100 | 100 |

FIG. 8A

|  | Example 1 | Example 2 | Example 3 | Example 4 | Example 5 |
|---|---|---|---|---|---|
| Presence/absence of change in cross-sectional area ratio (A2/A1) | Yes | Yes | Yes | Yes | Yes |
| Lower limit of cross-sectional area ratio (A2/A1) | 1.2 | 2.7 | 2.2 | 1.6 | 1.6 |
| Upper limit of cross-sectional area ratio (A2/A1) | 1.5 | 4.0 | 3.2 | 2.0 | 2.0 |
| Groove width ratio (W2/W1) | 1.5 | 4.0 | 3.2 | 1.9 | 2.0 |
| Groove width W1 of narrow groove portion | 2.0 | 1.5 | 1.0 | 4.0 | 1.5 |
| Maximum groove width W2 of widened portion | 3.0 | 6.0 | 3.2 | 7.8 | 3.0 |
| Depth range (%) of widening starting point | 30 to 50 | 40 to 60 | 40 to 60 | 40 to 60 | 40 to 60 |
| Size of first cross-sectional area S1 and second cross-sectional area S2 (Larger one if not identical) | S2 | S2 | S2 | S2 | S2 |
| Ratio (S2/S1) | 1.4 | 1.5 | 1.5 | 1.5 | 1.5 |
| Rolling resistance performance (index value) | 100 | 100 | 100 | 100 | 100 |
| Wet braking performance (index value: at 0% wear) | 102 | 105 | 105 | 105 | 102 |
| Wet braking performance (index value: at 80% wear) | 104 | 107 | 107 | 107 | 104 |
| Change in wet braking performance (index value) | 100 | 100 | 100 | 100 | 100 |

FIG. 8B

|  | Example 6 | Example 7 | Example 8 | Example 9 | Example 10 |
|---|---|---|---|---|---|
| Presence/absence of change in cross-sectional area ratio (A2/A1) | Yes | Yes | Yes | Yes | Yes |
| Lower limit of cross-sectional area ratio (A2/A1) | 2.1 | 1.6 | 2.1 | 2.1 | 1.6 |
| Upper limit of cross-sectional area ratio (A2/A1) | 2.7 | 2.7 | 2.7 | 2.7 | 2.7 |
| Groove width ratio (W2/W1) | 2.6 | 2.7 | 2.7 | 2.7 | 2.7 |
| Groove width W1 of narrow groove portion | 3.0 | 1.5 | 1.5 | 1.5 | 1.5 |
| Maximum groove width W2 of widened portion | 8.0 | 4.0 | 4.0 | 4.0 | 4.0 |
| Depth range (%) of widening starting point | 50 to 65 | 30 to 60 | 45 to 65 | 40 to 50 | 30 to 65 |
| Size of first cross-sectional area S1 and second cross-sectional area S2 (Larger one if not identical) | S2 | S2 | S2 | S2 | S2 |
| Ratio (S2/S1) | 1.4 | 2.0 | 1.6 | 1.2 | 2.2 |
| Rolling resistance performance (index value) | 100 | 100 | 100 | 100 | 100 |
| Wet braking performance (index value: at 0% wear) | 106 | 106 | 106 | 107 | 108 |
| Wet braking performance (index value: at 80% wear) | 108 | 108 | 108 | 109 | 110 |
| Change in wet braking performance (index value) | 100 | 100 | 100 | 100 | 100 |

FIG. 8C

TIRE

CROSS-REFERENCE TO RELATED APPLICATIONS

This application claims priority pursuant to 35 U.S.C. 119(a) to Japanese Patent Application No. 2020-165320, filed Sep. 30, 2020, which application is incorporated herein by reference in its entirety.

TECHNICAL FIELD

The present technology relates to a tire including a circumferential groove including a widened portion at the groove bottom, which has a widened groove width.

BACKGROUND ART

In general, tires including grooves in which a widened portion (space portion) having a cylindrical or spherical shape is formed by widening the groove width at the groove bottom more than the groove opening on the surface of the tread portion is known (see, for example, Japan Patent No. 3110847). Since this type of tires including grooves in which widened portions are formed have excellent drainage properties by ensuring a groove volume, wet traction performance when traveling on wet road surfaces such as in rainy weather is excellent.

Incidentally, in recent years, in order to improve rolling resistance coefficient (RRC), a configuration of a tread portion has been sought, in which a rib row, which is defined by a plurality of circumferential grooves, are divided by lug narrow grooves or sipes to have a rib-based block pattern, and block rows are disposed in a concentrated manner at a center portion with the circumferential grooves as narrow grooves. On the other hand, in a configuration in which the circumferential grooves are configured as narrow grooves, since the groove volume decreases and water drainage properties are deteriorated, a configuration is considered in which a widened portion is provided at the groove bottom of the circumferential groove to improve drainage properties as in Japan Patent No. 3110847.

However, in this configuration, as the wear of the tread portion progresses, there is a problem in that the wet traction performance changes abruptly since the widened portion of the circumferential groove is exposed at once across the tire circumferential direction in the middle stage of wear.

SUMMARY

The present technology provides a tire capable of exhibiting stable wet traction performance while suppressing reducing rolling resistance.

A tire according to an embodiment of the present technology includes a circumferential groove extending in a tire circumferential direction in a tread portion. The circumferential groove includes a narrow groove portion opening to a surface of the tread portion, and a widened portion having a wider groove width than the narrow groove portion, the widened portion is provided at a groove bottom, a groove width ratio (W2/W1) of a maximum groove width W2 of the widened portion to a groove width W1 of the narrow groove portion is in a range of $1.5 \leq (W2/W1) \leq 4.0$, and a cross-sectional area ratio (A2/A1) of a groove bottom-side cross-sectional area A2 to a groove opening-side cross-sectional area A1 in a tire meridian cross-section is within a range of $1.2 \leq (A2/A1) \leq 4.0$ when the circumferential groove is divided into two parts at a depth position of 50% of a maximum groove depth of the circumferential groove, and the cross-sectional area ratio (A2/A1) changes along the tire circumferential direction.

In the tire, preferably, in the circumferential groove, the groove width W1 of the narrow groove portion is in a range of $1.0 \text{ mm} \leq W1 \leq 4.0 \text{ mm}$ in a region where a groove depth from the surface of the tread portion is less than 30% of the maximum groove depth.

In the tire, preferably, the maximum groove width W2 of the widened portion is in a range of $3.0 \text{ mm} \leq W2 \leq 8.0 \text{ mm}$.

In the tire, preferably, the tire further includes a land portion defined by a plurality of the circumferential grooves. The land portion includes a block divided by a plurality of lug grooves or sipes that intersect the circumferential grooves, and the circumferential grooves have at least one local maximal value and at least one local minimal value as the cross-sectional area ratio (A2/A1) changes within a range of pitch length of the block in the tire circumferential direction.

In the tire, preferably, a plurality of lug grooves or sipes opening to the circumferential groove are provided in the tread portion, and a first cross-sectional area S1 of the widened portion that is cut by a tire meridian cross-section at an opening portion to which the lug groove or the sipe is opening, is smaller than a second cross-sectional area S2 of the widened portion that is cut by the tire meridian cross-section at an intermediate portion in the tire circumferential direction of an adjacent pair of the opening portions.

In the tire, preferably, the ratio (S2/S1) of the second cross-sectional area S2 to the first cross-sectional area S1 is $1.2 \leq (S2/S1) \leq 2.5$.

In the tire, preferably, the first cross-sectional area S1 is the smallest cross-sectional area of the widened portion, and at least one of a plurality of second cross-sectional areas S2 is the largest cross-sectional area of the widened portion.

In the tire, preferably, the circumferential groove has a widening starting position of the widened portion displacing within a range of 30% or more and 65% or less of the maximum groove depth.

In the tire according to an embodiment of the present technology, by changing the cross-sectional area ratio (As2/A1) of the groove bottom-side cross-sectional area A2 to the groove opening-side cross-sectional area A1 of the circumferential grooves along the tire circumferential direction, it is possible to gradually expose the widened portion of the circumferential groove as the wear of the tread portion progresses. And thus, while reducing rolling resistance stable wet traction performance can be exhibited.

BRIEF DESCRIPTION OF DRAWINGS

FIGS. 8A-8C include a table showing the results of performance tests of pneumatic tires according to the present embodiment.

DETAILED DESCRIPTION

Embodiments of the present technology are described in detail below with reference to the drawings. A pneumatic tire according to the present embodiment is, for example, a pneumatic tire for vehicles traveling a long distance such as a truck. However, the present technology is not limited by the embodiment. Constituents of the following embodiments include elements that are essentially identical or that can be substituted or easily conceived of by a person skilled in the art.

Figure 1:
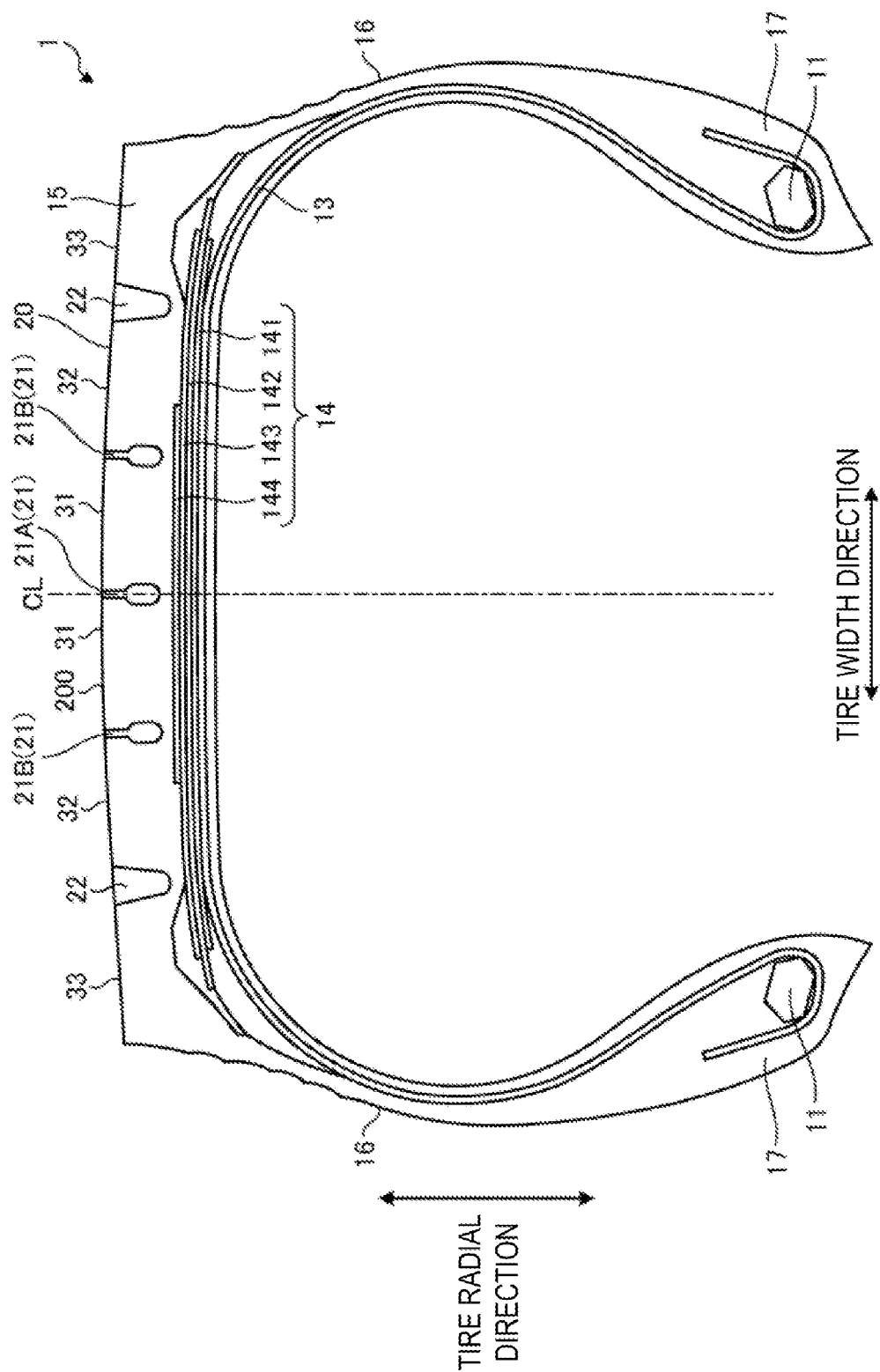
FIG. 1 is a meridian cross-sectional view illustrating main parts of a pneumatic tire according to an embodiment.
Figure 2:
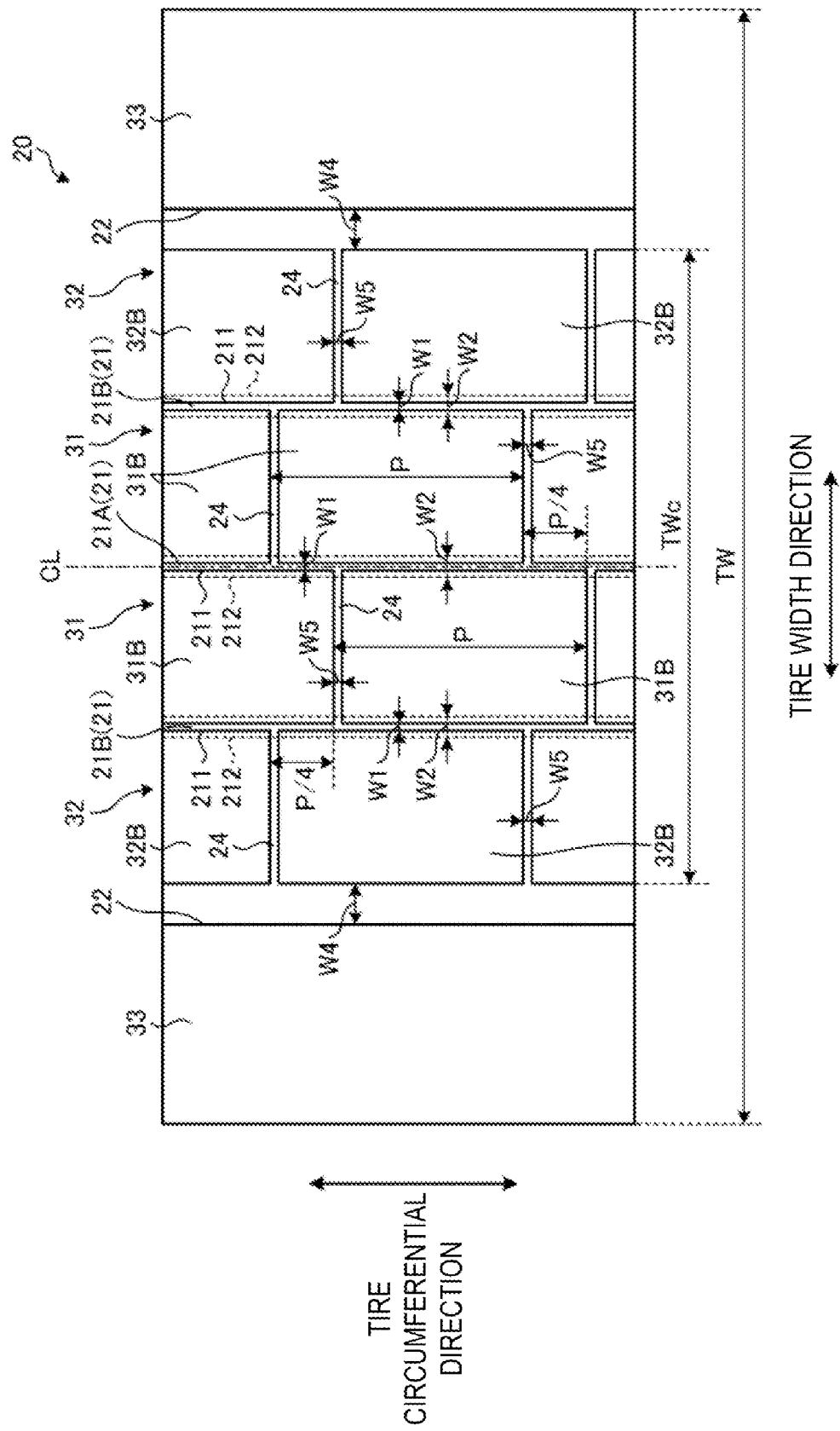
FIG. 2 is a developed view illustrating a tread pattern of a pneumatic tire.
Figure 3:
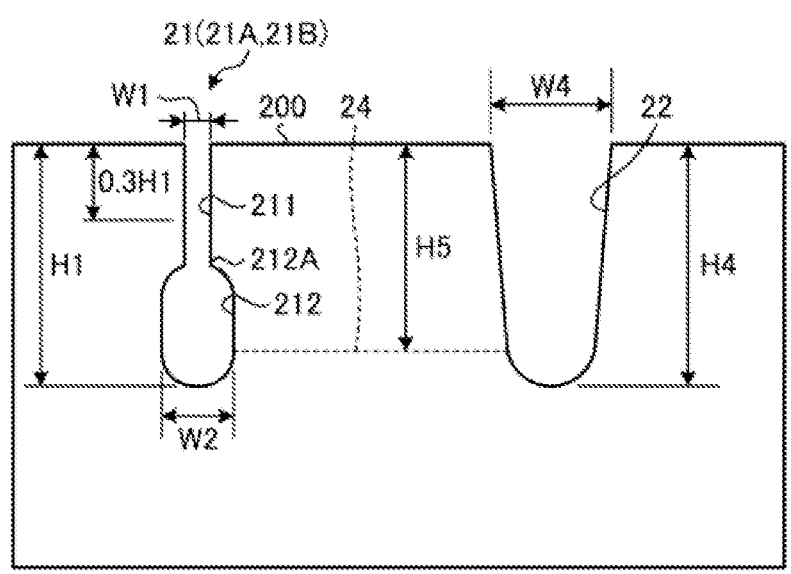
FIG. 3 is a schematic view illustrating a cross-sectional shape of a circumferential narrow main groove and a circumferential main groove formed in a tread portion.
Figure 4:
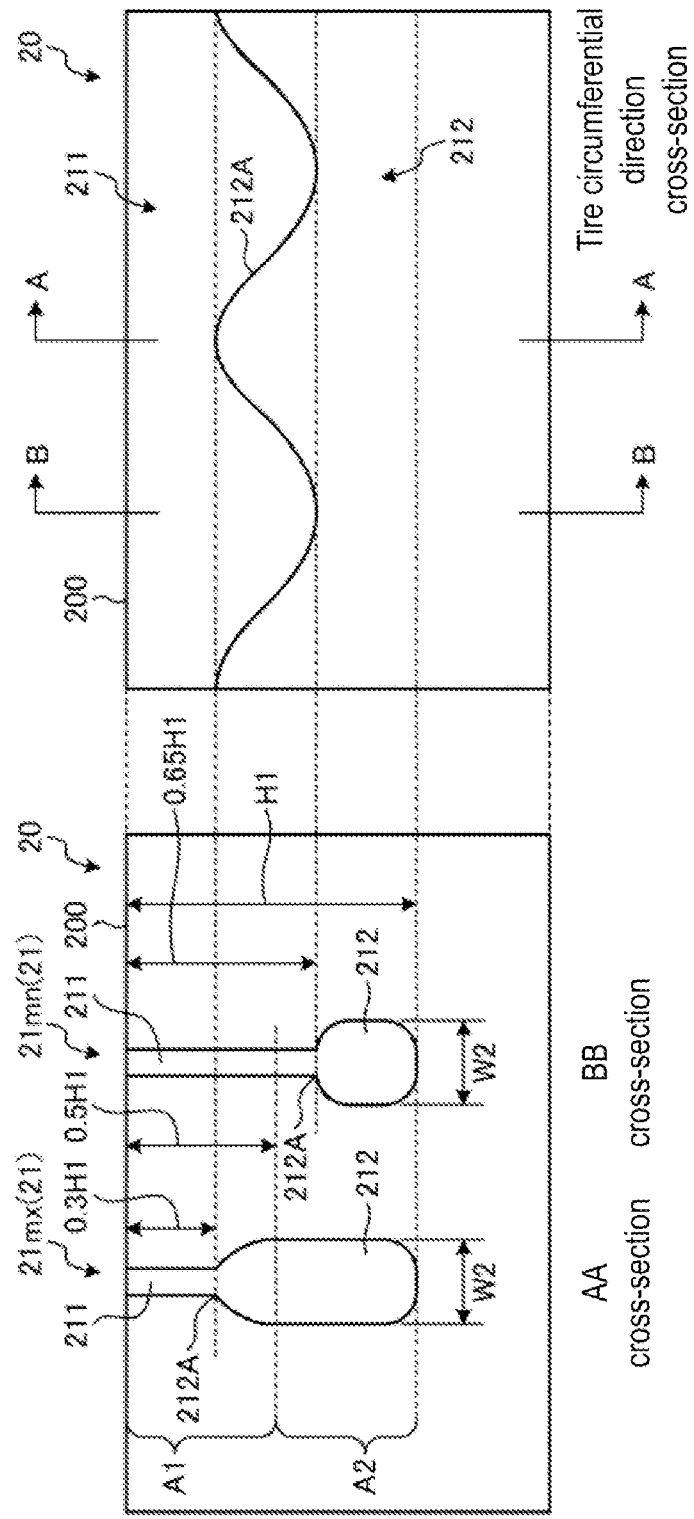
FIG. 4 is a schematic view illustrating a change in a tire circumferential direction of a cross-sectional shape of a circumferential narrow main groove formed in a tread portion.
Figure 5:
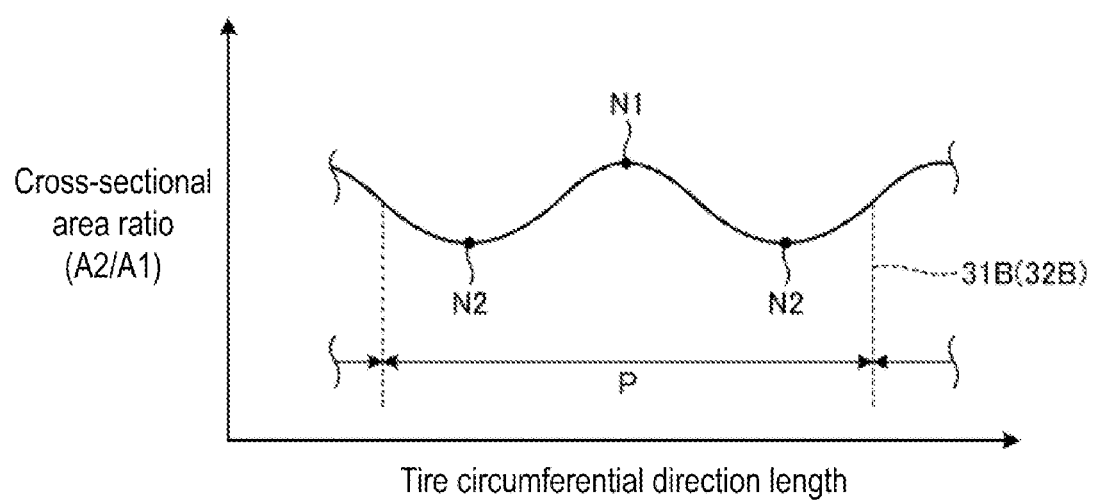
FIG. 5 is a diagram illustrating a change in a cross-sectional area ratio (A2/A1) with respect to a tire circumferential direction length of a circumferential narrow main groove.
Figure 6:
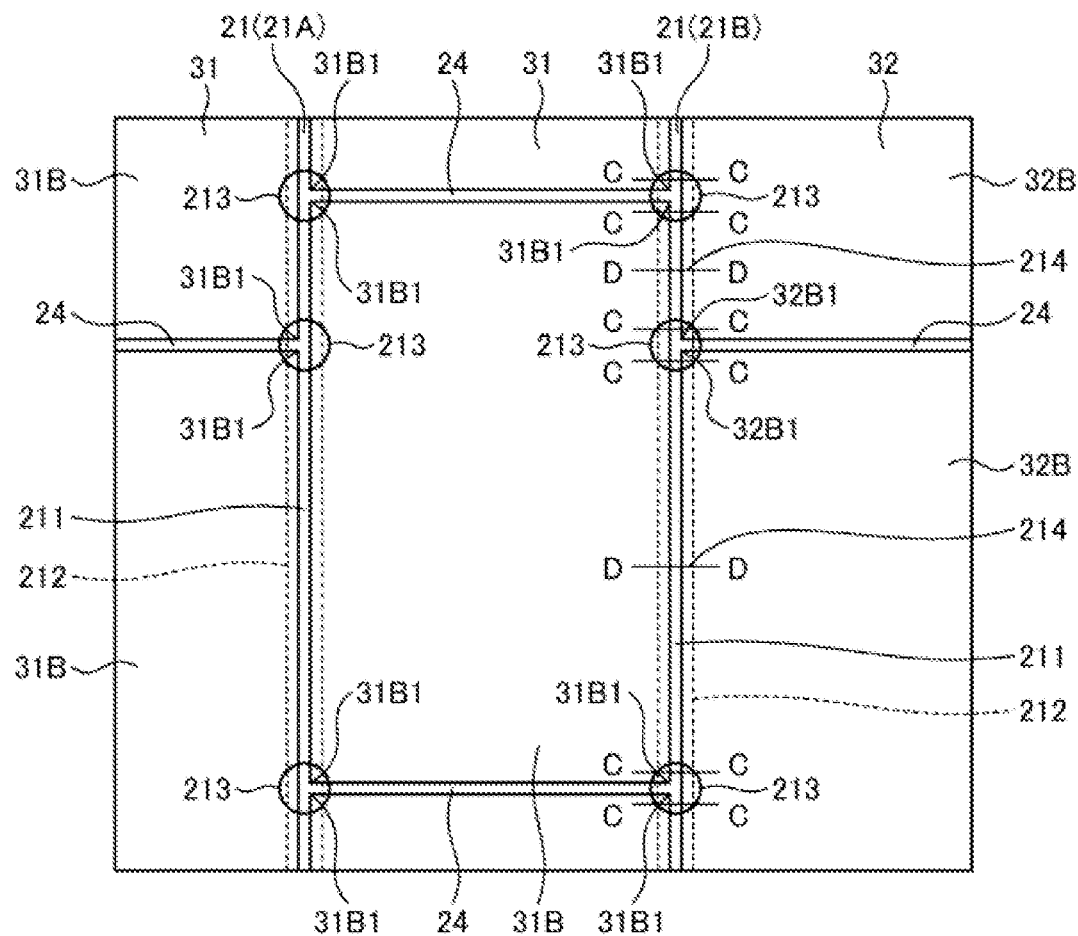
FIG. 6 is a partially enlarged view illustrating a tread pattern.
Figure 7:
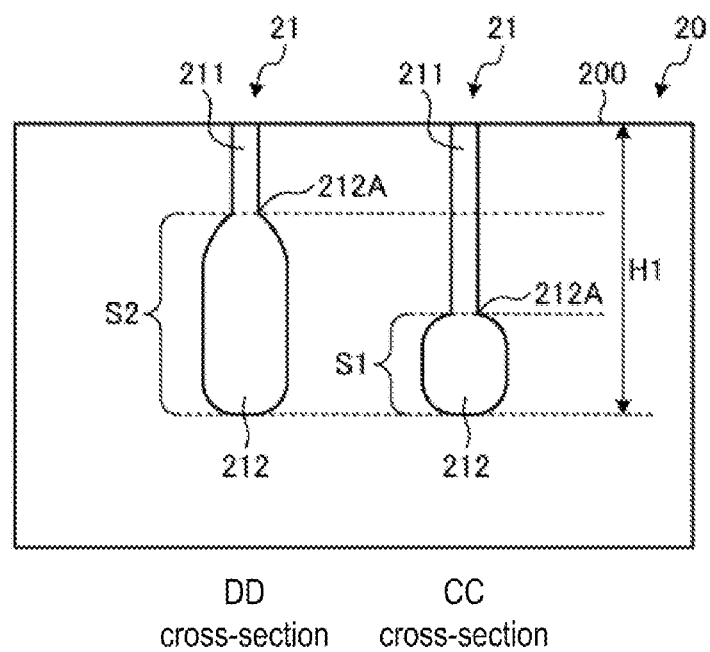
FIG. 7 is a schematic view illustrating a difference in cross-sectional shape depending on the position of a circumferential narrow main groove.

FIG. 1 is a meridian cross-sectional view illustrating main parts of a pneumatic tire according to the present embodiment. FIG. 1 illustrates a cross-sectional view of a half region of a pneumatic tire 1 (hereinafter sometimes referred to simply as a tire 1) in the tire radial direction. FIG. 2 is a developed view illustrating a tread pattern of a pneumatic tire. FIG. 3 is a schematic view illustrating a cross-sectional shape of a circumferential narrow main groove and a circumferential main groove formed in a tread portion. FIG. 4 is a schematic view illustrating a change in a tire circumferential direction of a cross-sectional shape of a circumferential narrow main groove formed in a tread portion. FIG. 5 is a diagram illustrating a change in a cross-sectional area ratio (A2/A1) with respect to a tire circumferential direction length of a circumferential narrow main groove. FIG. 6 is a partially enlarged view illustrating a tread pattern. FIG. 7 is a schematic view illustrating a difference in cross-sectional shape depending on the position of a circumferential narrow main groove. In the following description, the meridian cross-section refers to a cross-section when a tire is cut on a plane including a tire rotation axis (not illustrated). Further, the reference sign CL is a tire equatorial plane, and refers to a plane that passes through the center point of the tire in the tire rotation axis direction and is perpendicular to the tire rotation axis. Additionally, the tire width direction refers to a direction parallel with the tire rotation axis, the inner side in the tire width direction refers to the side toward the tire equatorial plane CL in the tire width direction, and the outer side in the tire width direction refers to the side away from the tire equatorial plane CL in the tire width direction. The tire radial direction refers to a direction perpendicular to the tire rotation axis, the inner side in the tire radial direction refers to the side toward the rotation axis in the tire radial direction, and the outer side in the tire radial direction refers to the side away from the rotation axis in the tire radial direction.

As illustrated in FIG. 1, a pneumatic tire 1 includes a pair of bead cores 11, 11, a carcass layer 13, a belt layer 14, a tread rubber 15 that constitutes a tread portion 20, sidewall rubbers 16, 16 that constitute left and right sidewall portions, and rim cushion rubbers 17, 17 that constitute left and right bead portions. The surface of the tread portion 20 forms a part of the contour of the pneumatic tire 1, and is formed as a road contact surface 200 that contacts the road surface when the vehicle travels. The belt layer 14 has a structure in which a plurality of belt plies are layered. In FIG. 1, the belt layer 14 has a structure in which a large-angle belt 141, a pair of cross belt plies 142, 143, and a belt cover 144 are layered. A bead filler may be provided on the outer side in the tire radial direction of the bead core 11. Note that the tire internal structure described above represents a typical example for a pneumatic tire, but the pneumatic tire is not limited thereto.

As illustrated in FIG. 2, the road contact surface 200 of the tread portion 20 is provided with a first circumferential narrow main groove (circumferential groove) 21A extending in the tire circumferential direction at a position of the tire equatorial plane CL, a pair of second circumferential narrow main grooves (circumferential grooves) 21B extending in the tire circumferential direction at positions further on the outer side in the tire width direction than the first circumferential narrow main groove 21A on both sides of the tire equatorial plane CL, and a pair of circumferential main grooves 22 extending in the tire circumferential direction at positions further on the outer side in the tire width direction than the second circumferential narrow main groove 21B. Preferably, the second circumferential narrow main groove 21B and the circumferential main groove 22 are disposed in left-right symmetry with respect to the tire equatorial plane CL. Note that, in a case where the first circumferential narrow main groove 21A and the second circumferential narrow main groove 21B are not distinguished, they are simply referred to as the circumferential narrow main groove 21.

The first circumferential narrow main groove 21A, the second circumferential narrow main groove 21B, and the circumferential main groove 22 are five circumferential main grooves each extending in the tire circumferential direction, and include a wear indicator defined by JATMA (The Japan Automobile Tyre Manufacturers Association, Inc.) in the groove bottom. The pair of circumferential main grooves 22 are shoulder main grooves located on the outermost side in the tire width direction and have a wider (larger) groove width than the three circumferential narrow main grooves 21 disposed between the circumferential main grooves 22, 22. The groove width is the distance between opposing wall surfaces of the groove, and in a case where the opening portion of the groove is chamfered, the distance between the intersection points assumed between the extension line of the road contact surface 200 and the extension lines of the wall surfaces of the groove is defined as the groove width. The groove width W1 of the circumferential narrow main groove 21 that opens to the road contact surface 200 when the tire is new is preferably 1.0 mm or more and 4.0 mm or less, and more preferably 1.5 mm or more and 3.0 mm or less. Additionally, the circumferential main groove 22 is the groove having the greatest groove width in the circumferential grooves formed in the tread portion 20. The groove width W4 of the circumferential main groove 22 when the tire is new is preferably 8.0 mm or more and 15.0 mm or less, and more preferably 10 mm or more and 13 mm or less. In the present embodiment, three circumferential narrow main grooves 21 are provided. However, it is sufficient that at least one circumferential narrow main groove 21 is provided between the circumferential main grooves 22, 22. In this case, preferably, one circumferential narrow main groove 21 is provided at the position of the tire equatorial plane CL (center in the tire width direction) or in the vicinity of the position of the tire equatorial plane CL.

The tread portion 20 is divided into the plurality of land portions by forming the first circumferential narrow main groove 21A, the second circumferential narrow main groove 21B, and the circumferential main groove 22. Specifically, in the tread portion 20, a first land portion 31 extending in the tire circumferential direction is formed between the first circumferential narrow main groove 21A and the second circumferential narrow main groove 21B. The first land portion 31 is divided into a plurality of blocks 31B by lug narrow grooves (lug grooves) 24 extending in the tire width direction. In other words, the first land portion 31 includes a plurality of blocks 31B divided by the lug narrow grooves 24 and arranged in the tire circumferential direction. The lug narrow groove 24 is open to and connects the adjacent first circumferential narrow main groove 21A and second circumferential narrow main groove 21B, or the adjacent second circumferential narrow main groove 21B and circumferential main groove 22, and have a groove width equal to or less than the width of the circumferential narrow main groove 21. Specifically, the groove width W5 of the lug narrow groove 24 when the tire is new is preferably 0.5 mm or more and 3.0 mm or less, and more preferably 1.0 mm or more and 2.0 mm or less. Note that, this lug narrow groove 24 may be configured as a sipe.

Additionally, in the tread portion 20, a second land portion 32 extending in the tire circumferential direction is formed between the second circumferential narrow main groove 21B and the circumferential main groove 22. The second land portion 32 is divided into a plurality of blocks 32B by the lug groove 24 extending in the tire width direction. In other words, the second land portion 32 includes a plurality of blocks 32B divided by the lug narrow grooves 24 and arranged in the tire circumferential direction.

Additionally, in the tread portion 20, a shoulder land portion 33 extending in the tire circumferential direction is formed on the outer side in the tire width direction of the circumferential main groove 22. The shoulder land portion 33 is located in the shoulder portion of the tread portion 20. The shoulder land portion 33 may include a plurality of shoulder lug grooves (not illustrated) having one end connected to the circumferential main grooves 22 and extending in the tire width direction and may be divided into a plurality of shoulder blocks by the shoulder lug grooves. In this case, the groove width of the shoulder lug groove is wider (larger) than the groove width W5 of the lug narrow groove 24, and is preferably 2.0 mm or more and 5.0 mm or less, for example.

The tread portion 20 includes the lug narrow grooves 24 all extending in the tire width direction and a plurality of rectangular blocks 31B, 32B, and the plurality of blocks 31B, 32B are disposed in a staggered manner to form a block pattern. In the example of FIG. 2, the first blocks 31B, 31B adjacent to each other with the first circumferential narrow main groove 21A in between are disposed to be displaced (shifted) by ¼ pitch (P/4) in the tire circumferential direction, and the first blocks 31B, 32B adjacent to each other with the second circumferential narrow main groove 21B in between are also disposed to be shifted by ¼ pitch (P/4) in the tire circumferential direction. Here, the pitch P refers to the distance when the blocks 31B, 32B are repeatedly disposed in the tire circumferential direction, and is the sum of the distance of the blocks 31B, 32B and the groove width of the lug narrow groove 24 in the tire circumferential direction. Note that the block pattern of the tread portion 20 is not limited to that illustrated in FIG. 2, and for example, the distance by which adjacent blocks are displaced with the circumferential narrow main groove 21 in between may be changed as appropriate. Further, the lug narrow groove 24 may extend in the direction inclined with respect to the tire width direction as well as extending in the tire width direction as long as the direction intersecting with the circumferential narrow main groove 21 and the circumferential main groove 22. For example, each of the first land portion 31 and the second land portion 32 on both sides with the tire equatorial plane CL in between may be inclined with respect to the tire width direction so that the inclination direction of the lug narrow grooves 24 is V-shaped.

In this configuration, the tread portion 20 defines the first land portion 31 and the second land portion 32 by the first circumferential narrow main groove 21A and the second circumferential narrow main groove 21B having a narrower groove width W1 than the groove width W4 of the circumferential main groove 22. As a result, when the tire 1 contacts the ground, the first circumferential narrow main groove 21A and the second circumferential narrow main groove 21B are closed, and the adjacent blocks 31B, 32B act as a wide block, whereby rolling resistance can be reduced. Furthermore, for the adjacent first land portions 31 or the adjacent first land portion 31 and second land portion 32, each of the blocks 31B, 32B are disposed being shifted in the tire circumferential direction. And thus, the lug narrow grooves 24 are prevented from communicating with each other, and noise when the tire 1 contacts the ground can be reduced. Additionally, since the lug narrow grooves 24 have the groove width W5 equal to or less than the groove width W1 of the circumferential narrow main groove 21, the traction performance can be improved while reducing the rolling resistance. Additionally, since the circumferential main groove 22 is the main groove located on the outermost side in the tire width direction, it has less influence on rolling resistance than the circumferential narrow main groove 21 disposed on the center side. In this configuration, by setting the groove width W4 of the circumferential main groove 22 to 8.0 mm or more and 15.0 mm or less, the wet traction performance can be improved without deteriorating the rolling resistance.

In the tread portion 20, the ratio (TWc/TW) of the length TWc in the tire width direction of the arrangement range of the blocks 31B, 32B to the tread development width TW is preferably in the range of 0.55 or more and 0.70 or less, and more preferably 0.60 or more and 0.65 or less. By setting the ratio (TWc/TW) to the range of 0.55 or more and 0.70 or less, it is possible to form a tread pattern in which block rows are disposed as concentrating in the center portion of the tread portion 20. As a result, the rigidity of the tread portion 20 can be increased, and the effect of reducing rolling resistance can be improved.

Here, the length TWc is the length in the tire width direction between the pair of circumferential main grooves 22, 22, and is the sum of the width of the four block rows (the first land portion 31 and the second land portion 32) and the groove width W1 of three circumferential narrow main grooves 21. In other words, the length TWc refers to the linear distance between the pair of circumferential main grooves 22, 22 of the tread portion 20 of the tire 1 in a developed view, in a state in which the tire 1 is mounted on a specified rim and inflated to a specified internal pressure, and no load is applied. The tread development width TW is the distance in the tire width direction between both ends on the outer side in the tire width direction of two shoulder land portions 33. The tread development width TW refers to the linear distance between both ends of the tread portion 20 of the tire 1 in a developed view, in a state in which the tire 1 is mounted on a specified rim and inflated to a specified internal pressure, and no load is applied. "Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

Incidentally, as described above, in this configuration, in order to reduce the rolling resistance of the tire 1, the tread portion 20 has a configuration in which the first land portion 31 and the second land portion 32 are defined by the first circumferential narrow main groove 21A and the second circumferential narrow main groove 21B having the narrower groove width W1 than the groove width W4 of the circumferential main groove 22. On the other hand, in the configuration described above, since the groove volume of the circumferential narrow main groove 21 is reduced, and the drainage properties are deteriorated, there is a concern that the wet traction performance inherent in the block pattern is deteriorated. And thus, as illustrated in FIG. 3, the circumferential narrow main groove 21 has a stepped groove shape including a narrow groove portion 211 and a widened portion 212 disposed further on the groove bottom side (the inner side in the tire radial direction) than the narrow groove portion 211 and having a wider groove width than the narrow groove portion 211.

The narrow groove portion 211 of the circumferential narrow main groove 21 is a portion that opens to the road contact surface 200 of the tread portion 20 and is in a region that is less than 30% (0.3H1) of the maximum groove depth H1 from the road contact surface 200. This maximum groove depth H1 refers to the groove depth of the circumferential narrow main groove 21 when the tire is new. The groove width W1 of the narrow groove portion 211 is preferably 1.0 mm or more and 4.0 mm or less. When the groove width W1 is less than 1.0 mm, since drainage properties are deteriorated, the traction performance is deteriorated. On the other hand, if the groove width W1 is larger than 4.0 mm, the rigidity of the block rows adjacent to the circumferential narrow main groove 21 in between will decrease, and the rolling resistance deteriorates. In this configuration, by setting the groove width W1 of the narrow groove portion 211 to 1.0 mm or more and 4.0 mm or less, the circumferential narrow main grooves 21 are closed when the tire 1 contacts the ground and the groove walls support each other. And thus, the block rigidity can be improved, whereby the energy loss in the groove bottom portion and the rolling resistance can be reduced. The groove width W1 of the narrow groove portion 211 is more preferably 1.5 mm or more and 3.0 mm or less.

The widened portion 212 is a portion that includes a widening starting point 212A connected to the narrow groove portion 211 on the outer side in the tire radial direction and is in a region of 30% or more of the maximum groove depth H1 from the surface of the tread portion 20. The widened portion 212 has a maximum groove width W2 that is wider than the groove width W1 of the narrow groove portion 211. The widening starting point 212A refers to a height position at which the groove width is widened to be equal to or greater than a predetermined value (for example, the smaller one of 1.2 times the groove width W1 of the narrow groove portion 211 and the groove width W1+0.5 mm). In this configuration, since the circumferential narrow main groove 21 is provided with the widened portion 212 that is wider than the narrow groove portion 211 in a region of 30% or more of the maximum groove depth H1 from the surface of the tread portion 20, the drainage properties are improved due to the water entering the widened portion 212, and a decrease in the wet traction performance can be suppressed.

Specifically, the maximum groove width W2 of the widened portion 212 is preferably 3.0 mm or more and 8.0 mm or less. If the maximum groove width W2 is less than 3.0 mm, the decrease in wet traction performance cannot be sufficiently suppressed. On the other hand, if the maximum groove width W2 is larger than 8.0 mm, since the rigidity of the block rows adjacent to the circumferential narrow main groove 21 in between is reduced, the rolling resistance deteriorates. Additionally, if the maximum groove width W2 is larger than 8.0 mm, since the degree of widening with respect to the groove width W1 of the narrow groove portion 211 is excessively large, processing of the circumferential narrow main groove 21 is difficult and productivity will be deteriorated. By setting the maximum groove width W2 of the widened portion 212 to 3.0 mm or more and 8.0 mm or less, it is possible to decrease the rolling resistance and suppress a decrease in wet traction performance in a compatible manner. The maximum groove width W2 of the widened portion 212 is more preferably 4.0 mm or more and 6.5 mm or less.

Additionally, in the circumferential narrow main groove 21, the ratio (W2/W1) of the maximum groove width W2 of the widened portion 212 to the groove width W1 of the narrow groove portion 211 is preferably in the range of 1.5 or more and 4.0 or less. If the ratio (W2/W1) is less than 1.5, the reduction in the wet traction performance cannot be sufficiently suppressed. On the other hand, if the ratio (W2/W1) is larger than 4.0, since the rigidity of block row adjacent to the circumferential narrow main groove 21 in between is reduced, the rolling resistance will deteriorate. Additionally, if the ratio (W2/W1) is larger than 4.0, since the degree of widening of the maximum groove width W2 of the widened portion 212 with respect to the groove width W1 of the narrow groove portion 211 is excessively large, processing of the circumferential narrow main groove 21 is difficult and productivity will be deteriorated. In this configuration, by setting the ratio (W2/W1) to 1.5 or more and 4.0 or less, it is possible to reduce the rolling resistance and suppress a reduction in the wet traction performance in a compatible manner. The ratio W2/W1 is more preferably 1.5 or more and 3.0 or less.

In the tire 1, the maximum groove depth H1 of the circumferential narrow main groove 21 is formed to be equivalent to the groove depth H4 of the circumferential main groove 22. Specifically, the ratio (H1/H4) of the maximum groove depth H1 to the groove depth H4 is 0.95 or more and 1.05 or less. And thus, the circumferential narrow main groove 21 ensures the drainage properties together with the circumferential main groove 22 at the terminal stages of wear, whereby the wet traction performance can be improved. Additionally, the ratio (H5/H1) of the groove depth H5 of the lug narrow groove 24 to the maximum groove depth H1 of the circumferential narrow main groove 21 is 0.45 or more and 0.90 or less. By providing the lug narrow grooves 24 having a narrow groove width in this range, it is possible to suppress a decrease in the wet traction performance without deteriorating the rolling resistance even in a state of being worn to some extent.

By providing the widened portion 212 at the groove bottom of the circumferential narrow main groove 21 as described above, the reduction in wet traction performance can be suppressed even in a configuration in which the first land portion 31 and the second land portion 32 are defined by the circumferential narrow main groove 21 having a small groove width. On the other hand, when the cross-sectional area (height) of the widened portion 212 is formed uniformly in the tire circumferential direction, there is a problem that the wet traction performance may change abruptly since the widened portion 212 is exposed at once across the tire circumferential direction in the middle state of wear when the wear of the tread portion 20 progresses.

Thus, in this configuration, as illustrated in FIG. 4, the circumferential narrow main groove 21 has a configuration in which the cross-sectional area (height) of the widened portion 212 is changed along the tire circumferential direction by changing the height position of the widening starting point 212A of the widened portion 212 in a state in which the maximum groove depth H1 from the road contact surface 200 and the maximum groove width W2 of the widened portion 212 are maintained substantially identical. FIG. 4 illustrates two types of circumferential narrow main grooves including a circumferential narrow main groove 21$mx$ (AA cross-section) having a maximum height (cross-sectional area) of the widened portion 212 and a circumferential narrow main groove 21$mn$ (BB cross-section) having a smallest cross-sectional area of the widened portion 212.

Here, the widening starting point 212A of the widened portion 212 is preferably displaced within a range of 30% (0.3H1) or more and 65% (0.65H1) or less of the maximum groove depth H1 from the road contact surface 200. In other words, the cross-sectional area of the widened portion 212 is greatest at a position where the widening starting point 212A is 30% of the maximum groove depth H1 from the road contact surface 200, and is smallest at a position where the widening starting point 212A is 65% of the maximum groove depth H1 from the road contact surface 200. When the widening starting point 212A of the widened portion 212 is at a shallow position of less than 30% of the maximum groove depth H1 from the road contact surface 200, the circumferential narrow main groove 21 is closed when the tire 1 contacts the ground, and the support of groove walls (land portions) is insufficient, and rolling resistance cannot be reduced. Additionally, when the widening starting point 212A of the widened portion 212 is at a deeper position than 65% of the maximum groove depth H1 from the road contact surface 200, sufficient wet traction performance at the terminal stages of wear cannot be expected. In the configuration, the widening starting point 212A of the widened portion 212 is displaced within a range of 30% or more and 65% or less of the maximum groove depth H1 from the road contact surface 200, it is possible to achieve both a reduction in rolling resistance and a sufficient improvement in wet traction performance at the terminal stages of wear in a compatible manner.

In the tire 1, when the circumferential narrow main groove 21 is divided into two parts in the tire radial direction at the position of 50% (0.5H1) of the maximum groove depth H1 from the road contact surface 200 of the tread portion 20, the cross-sectional area ratio (A2/A1) of a groove bottom-side cross-sectional area A2 to a groove opening-side cross-sectional area A1 in the tire meridian cross-section of the circumferential narrow main groove 21 is preferably 1.2 or more and 4.0 or less. The groove opening-side cross-sectional area A1 is mainly the cross-sectional area of the narrow groove portion 211, and the groove bottom-side cross-sectional area A2 is mainly the cross-sectional area of the widened portion 212. If the cross-sectional area ratio (A2/A1) is less than 1.2, since the groove bottom-side cross-sectional area A2, that is, the cross-sectional area (volume) of the widened portion 212, becomes relatively small, the reduction in wet traction performance cannot be sufficiently suppressed. On the other hand, if the cross-sectional area ratio (A2/A1) is larger than 4.0, since the cross-sectional area (volume) of the widened portion 212 becomes relatively large, the rigidity of the block rows adjacent to each other with the circumferential narrow main groove 21 in between will decrease, and the rolling resistance will be deteriorated. By setting the cross-sectional area ratio (A2/A1) to 1.2 or more and 4.0 or less, it is possible to reduce the rolling resistance and suppress a reduction in the wet traction performance in a compatible manner. Furthermore, the cross-sectional area ratio (A2/A1) is more preferably in the range of 1.6 or more and 2.7 or less, and more preferably in the range of 2.1 or more and 2.7 or less.

In this configuration, the cross-sectional area ratio (A2/A1) changes along the tire circumferential direction, which is the extension direction of the circumferential narrow main groove 21, as the cross-sectional area of the widened portion 212 changes. By changing this cross-sectional area ratio (A2/A1) along the tire circumferential direction within the range described above, the widened portion 212 can be gradually exposed as the wear of the tread portion 20 progresses. Accordingly, it is possible to suppress the widened portion 212 from being exposed at once as the wear progresses, to alleviate the change in the groove area of the circumferential narrow main groove 21, and to ensure stable wet traction performance from the new tire to the terminal stages of wear. In addition, although that the change in the cross-sectional area ratio (A2/A1) described above is preferably continuous, such as a sine wave shape or a triangular wave shape, the change may be intermittent (including a non-changing portion) such as a rectangular wave shape. Furthermore, in this configuration, the height (the position of the widening starting point 212A) of the widened portion 212 is changed when changing the cross-sectional area ratio (A2/A1), but the configuration is not limited thereto, and both the height and the groove width of the widened portion 212 may be changed.

In the tire 1, when the cross-sectional area ratio (A2/A1) of the circumferential narrow main groove 21 is changed, a local maximal value and a local minimal value associated with this change will occur. In this configuration, as illustrated in FIG. 5, the circumferential narrow main groove 21 preferably has at least one local maximal value N1 and at least one local minimal value N2 of the cross-sectional area ratio (A2/A1) within the range of the pitch P of the blocks 31B, 32B. According to this configuration, when the blocks 31B, 32B, each of which are aligned in the tire circumferential direction, are worn, the respective widened portions 212 can be partially exposed within the range of the pitch P of each of the blocks 31B, 32B. As a result, the region where the widened portion 212 is exposed can be prevented from being biased to a portion in the tire circumferential direction, and stable wet traction performance can be ensured from the new tire to the terminal stages of wear.

As described above, the plurality of lug narrow grooves 24 for defining the first land portion 31 and the second land portion 32 into the plurality of blocks 31B, 32B are respectively connected to the circumferential narrow main grooves 21 defining the first land portion 31 and the second land portion 32. And thus, as illustrated in FIG. 6, the circumferential narrow main grooves 21 have opening portions 213 opening to the plurality of lug narrow grooves 24, respectively. Here, the cross-sectional area of the widened portion 212 when the circumferential narrow main groove 21 in the opening portion 213 is cut along the tire meridian cross-section is referred to as a first cross-sectional area S1. In this case, since the widened portion 212 is connected to the lug narrow groove 24 in a portion where the lug narrow groove 24 is actually opening to the circumferential narrow main groove 21, the contour of the widened portion 212, that is, the first cross-sectional area S1, cannot be determined. And thus, the opening portion 213 includes the vicinity of a portion of the circumferential narrow main groove 21 connected to the lug narrow groove 24 in order to define the contour of the widened portion 212. Specifically, the opening portion 213 includes the edge portions 31B1, 32B1 of one of the blocks 31B, 32B disposed with the circumferential narrow main groove 21 in between, and the first cross-sectional area S1 is measured at the tire meridian cross-sections (CC cross-section in FIG. 6) of the edge portions 31B1, 32B1.

An intermediate portion 214 is defined at a position that is approximately at the identical distance in the tire circumferential direction from a pair of adjacent opening portions 213, 213 on the circumferential narrow main groove 21, and the cross-sectional area of the widened portion 212 when the circumferential narrow main groove 21 in the intermediate portion 214 is cut along the tire meridian cross-section (DD cross-section in FIG. 6) is referred to as a second cross-sectional area S2. In this case, the first cross-sectional area S1 of the widened portion 212 in the opening portion 213 is formed smaller than the second cross-sectional area S2 of the widened portion 212 in the intermediate portion 214, as illustrated in FIG. 7. According to this configuration, by reducing the groove volume of the opening portions 213, that is, the edge portions 31B1, 32B1 of the blocks 31B, 32B, the block rigidity is increased and rolling resistance can be reduced.

Additionally, the ratio (S2/S1) of the second cross-sectional area S2 to the first cross-sectional area S1 is preferably $1.2 \leq (S2/S1) \leq 2.5$. If the ratio (S2/S1) is less than 1.2, the second cross-sectional area S2 is smaller than the first cross-sectional area S1, and the deterioration of wet traction performance cannot be sufficiently suppressed. On the other hand, if the ratio (S2/S1) is larger than 2.5, since the second cross-sectional area S2 is excessively larger than the first cross-sectional area S1, the rigidity of the block rows adjacent to each other with the circumferential narrow main groove 21 in between is reduced, and thus, the rolling resistance is deteriorated. Since the ratio (S2/S1) satisfies the range of $1.2 \leq (S2/S1) \leq 2.5$, it is possible to achieve both a decrease in rolling resistance and a suppression of a decrease in wet traction performance in a compatible manner.

In the present embodiment, the first cross-sectional area S1 of the widened portion 212 in the opening portion 213 is preferably the smallest cross-sectional area of the widened portion 212 that changes along the tire circumferential direction. According to this configuration, since the widened portion 212 having the smallest cross-sectional area is positioned in the opening portion 213, block rigidity can be maintained until the terminal stages of wear, and rolling resistance can be reduced. Additionally, at least one of the second cross-sectional areas S2 of the widened portions 212 in the intermediate portion 214 is preferably the largest cross-sectional area of the widened portion 212 that changes along the tire circumferential direction. Here, when the distances between pairs of adjacent opening portions 213 differ, the second cross-sectional area S2 of the widened portion 212 of the intermediate portion 214 located between the opening portions 213 having the longest distance is preferably the largest cross-sectional area. According to this configuration, since the widened portion having the largest cross-sectional area is located in the intermediate portion 214, when the wear progresses to some extent, water enters the widened portion 212 exposed to the intermediate portion 214, and thus the drainage properties are improved and the wet traction performance can be improved.

EXAMPLES

FIGS. 8A-8C include a table showing the results of performance tests of pneumatic tires according to the present embodiment. In the performance test, the rolling resistance performance and the wet traction performance were evaluated for a plurality of types of test tires. In addition, the wet traction performance was evaluated when the circumferential narrow main groove 21 is new (worn 0%) and worn 80%. The size of the pneumatic tire 1 used for evaluation is 315/70R22.5. The vehicle used for evaluation is a vehicle in which a trailer is connected to a 6×4 tractor.

An indoor drum testing machine is used to evaluate the rolling resistance performance. In the evaluation of the rolling resistance performance, the test tires are inflated to the specified internal pressure, and the resistance at a load of 31.26 kN and a speed of 80 km/h is measured. The measurement results are expressed as index values and evaluated with Conventional Example being assigned as the reference (100). In the evaluation, larger index values indicate less rolling resistance and thus superior rolling resistance performance.

In the evaluation of wet traction performance, the test tire is mounted on a rim of 22.5×9.00, inflated to an air pressure of 900 kPa, and mounted on a drive shaft of a tractor head, and the wet braking performance is evaluated. In the evaluation of wet braking performance, the deceleration G is measured in a test course when a test vehicle having the test tire mounted thereon decelerates from an initial speed of 60 km/h to 20 km/h on a road surface with water sprayed to a depth of approximately 1 mm. The measured decelerations G are expressed as index values and evaluated with Conventional Example being assigned as the reference (100). In the evaluation, larger values indicate shorter braking distance and superior wet braking performance, that is, wet traction performance. Furthermore, the change in wet braking performance was evaluated from the deceleration G when new and the deceleration G at 80% wear. In this evaluation of the change in wet braking performance, the rate of change of the deceleration G when 80% wear with respect to the deceleration G when the tire is new is calculated, and the reciprocals of the rate of change are expressed as index values and evaluated with Conventional Example being assigned as the reference (100). In the evaluation, larger values indicate smaller changes in wet braking performance, that is superior in exhibiting stable wet traction performance. Note that although in the tire of Conventional Example, the circumferential narrow main groove includes a widened portion, the tire includes a tread portion in which, when the circumferential narrow main groove is divided into two parts in the tire radial direction at the position of 50% of the maximum groove depth H1 from the road contact surface 200, the cross-sectional area ratio (A2/A1) of the groove bottom-side cross-sectional area A2 to the groove opening-side cross-sectional area A1 in the tire meridian cross-section of the circumferential narrow main groove does not change.

As shown in FIGS. 8A-8C, in the test tires of Conventional Example, Comparative Examples 1 to 4, and Examples 1 to 10, the presence/absence of a change in the cross-sectional area ratio (A2/A1) of the groove bottom-side cross-sectional area A2 to the groove opening-side cross-sectional area A1, the lower limit and the upper limit of the cross-sectional area ratio (A2/A1), the groove width W1 of the narrow groove portion 211, the maximum groove width W2 of the widened portion 212, the ratio (W2/W1) of the maximum groove width W2 to the groove width W1, the depth range of the widening starting point 212A, the sizes of the first cross-sectional area S1 and the second cross-sectional area S2 of the widened portion, and the ratio (S2/S1) of the second cross-sectional area S2 to the first cross-sectional area S1 differ one another. The test tire of Conventional Example includes a tread portion in which the cross-sectional area ratio (A2/A1) does not change, although the circumferential narrow main groove includes a widened portion.

As the result of the performance evaluation tests performed using these test tires, as shown in FIGS. 8A-8C, the test tires of Examples 1 to 10 can reduce the rolling resistance and improve the wet braking performance when the tire is new and worn 80% as compared with Conventional Example. In particular, it was possible to exhibit stable wet traction performance with a small change in wet braking performance. On the other hand, since the test tires of Comparative Examples 1 to 4 do not satisfy the predetermined conditions, the effect of achieving the reduction in rolling resistance and the stable wet traction performance in a compatible manner is not sufficiently obtained.

Embodiments of the present technology have been described above, but the present technology is not limited to the embodiments described above. For example, in the present embodiment, a pneumatic tire has been described as an example of a tire, but the present technology is not limited to this, and the present embodiment can naturally be applied to a tire that is not filled with air, such as an airless tire. In addition, inert gas such as nitrogen, argon, and helium in addition to ordinary air or air with an adjusted oxygen partial pressure can be used as the gas to be filled in the pneumatic tire illustrated in the present embodiment.

The invention claimed is:

1. A tire comprising a circumferential groove extending in a tire circumferential direction in a tread portion, wherein
the circumferential groove comprises a narrow groove portion opening to a surface of the tread portion, and a widened portion having a wider groove width than the narrow groove portion, the widened portion being provided at a groove bottom,
a groove width ratio (W2/W1) of a maximum groove width W2 of the widened portion to a groove width W1 of the narrow groove portion is in a range of $1.5 \leq (W2/W1) \leq 4.0$,
a cross-sectional area ratio (A2/A1) of a groove bottom-side cross-sectional area A2 to a groove opening-side cross-sectional area A1 in a tire meridian cross-section is within a range of $1.2 \leq (A2/A1) \leq 4.0$ when the circumferential groove is divided into two parts at a depth position of 50% of a maximum groove depth of the circumferential groove, and the cross-sectional area ratio (A2/A1) continuously changes along the tire circumferential direction, and
a height of a widening starting point of the widened portion or both the height of the widening starting point and the groove width of the widened portion are changed with changing of the cross-sectional area ratio (A2/A1).

2. The tire according to claim 1, wherein in the circumferential groove, the groove width W1 of the narrow groove portion is in a range of $1.0 \text{ mm} \leq W1 \leq 4.0 \text{ mm}$ in a region where a groove depth from the surface of the tread portion is less than 30% of the maximum groove depth.

3. The tire according to claim 2, wherein the maximum groove width W2 of the widened portion is in a range of $3.0 \text{ mm} \leq W2 \leq 8.0 \text{ mm}$.

4. The tire according to claim 3, further comprising a land portion defined by a plurality of the circumferential grooves, wherein
the land portion comprises a block divided by a plurality of lug grooves or sipes that intersect the circumferential grooves, and
the circumferential grooves have at least one local maximal value and at least one local minimal value as the cross-sectional area ratio (A2/A1) changes within a range of pitch length of the block in the tire circumferential direction.

5. The tire according to claim 4, wherein
a plurality of lug grooves or sipes opening to the circumferential groove are provided in the tread portion, and
a first cross-sectional area S1 of the widened portion that is cut by a tire meridian cross-section at an opening portion to which the lug groove or the sipe is opening, is smaller than a second cross-sectional area S2 of the widened portion that is cut by the tire meridian cross-section at an intermediate portion in the tire circumferential direction of an adjacent pair of the opening portions.

6. The tire according to claim 5, wherein the ratio (S2/S1) of the second cross-sectional area S2 to the first cross-sectional area S1 is $1.2 \leq (S2/S1) \leq 2.5$.

7. The tire according to claim 6, wherein the first cross-sectional area S1 is the smallest cross-sectional area of the widened portion, and at least one of a plurality of second cross-sectional areas S2 is the largest cross-sectional area of the widened portion.

8. The tire according to claim 7, wherein the circumferential groove has a widening starting position of the widened portion displacing within a range of 30% or more and 65% or less of the maximum groove depth.

9. The tire according to claim 1, wherein the maximum groove width W2 of the widened portion is in a range of $3.0 \text{ mm} \leq W2 \leq 8.0 \text{ mm}$.

10. The tire according to claim 1, further comprising a land portion defined by a plurality of the circumferential grooves, wherein
the land portion comprises a block divided by a plurality of lug grooves or sipes that intersect the circumferential grooves, and
the circumferential grooves have at least one local maximal value and at least one local minimal value as the cross-sectional area ratio (A2/A1) changes within a range of pitch length of the block in the tire circumferential direction.

11. The tire according to claim 1, wherein
a plurality of lug grooves or sipes opening to the circumferential groove are provided in the tread portion, and
a first cross-sectional area S1 of the widened portion that is cut by a tire meridian cross-section at an opening portion to which the lug groove or the sipe is opening, is smaller than a second cross-sectional area S2 of the widened portion that is cut by the tire meridian cross-section at an intermediate portion in the tire circumferential direction of an adjacent pair of the opening portions.

12. The tire according to claim 11, wherein the ratio (S2/S1) of the second cross-sectional area S2 to the first cross-sectional area S1 is 1.2≤(S2/S1)≤2.5.

13. The tire according to claim 11, wherein the first cross-sectional area S1 is the smallest cross-sectional area of the widened portion, and at least one of a plurality of second cross-sectional areas S2 is the largest cross-sectional area of the widened portion.

14. The tire according to claim 1, wherein the circumferential groove has a widening starting position of the widened portion displacing within a range of 30% or more and 65% or less of the maximum groove depth.

15. The tire according to claim 1, wherein the widening starting point refers to a height position at which the groove width is widened to be equal to or greater than a predetermined value which is a smaller one of 1.2 times the groove width W1 of the narrow groove portion and the groove width W1+0.5 mm.

16. The tire according to claim 1, wherein the cross-sectional area ratio (A2/A1) continuously changes along the tire circumferential direction in a sine wave shape or a triangular wave shape.

\* \* \* \* \*